W. H. MUZZY.
VALIDATING STAMPING SYSTEM.
APPLICATION FILED DEC. 27, 1904. RENEWED JAN. 28, 1909.

1,149,395.

Patented Aug. 10, 1915.
2 SHEETS—SHEET 1.

Witnesses
Inventor

W. H. MUZZY.
VALIDATING STAMPING SYSTEM.
APPLICATION FILED DEC. 27, 1904. RENEWED JAN. 28, 1909.
1,149,395.
Patented Aug. 10, 1915.
2 SHEETS—SHEET 2.
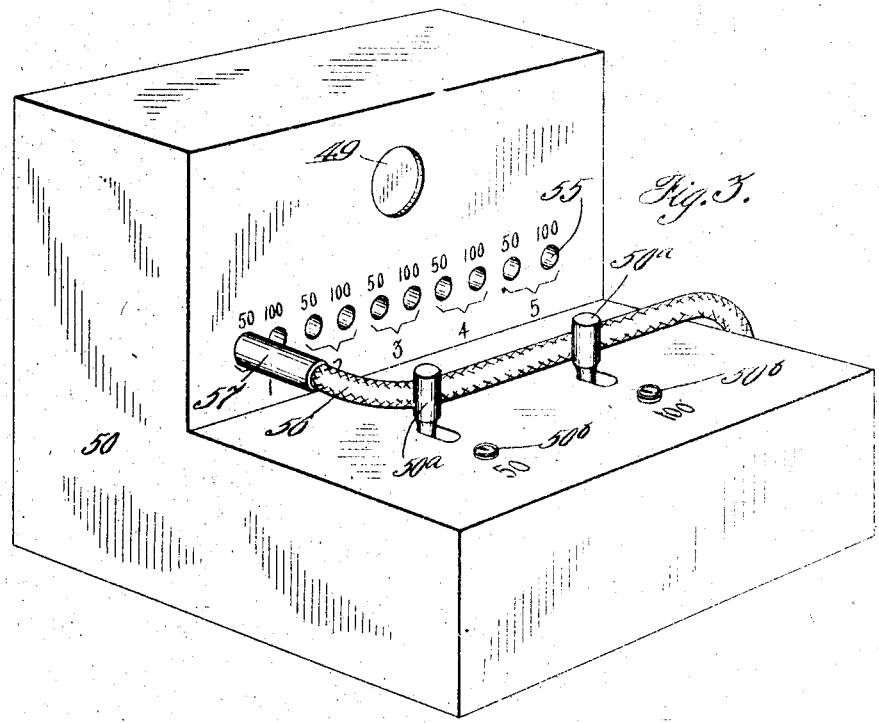
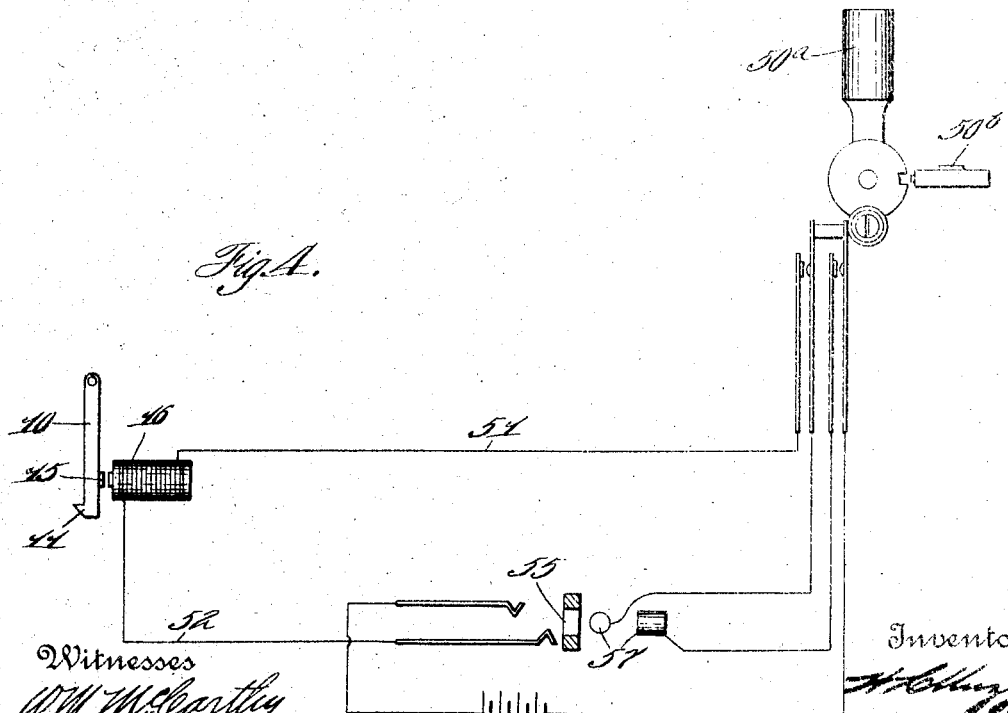

UNITED STATES PATENT OFFICE.

WILLIAM H. MUZZY, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

VALIDATING STAMPING SYSTEM.

1,149,395.  Specification of Letters Patent.  Patented Aug. 10, 1915.

Application filed December 27, 1904, Serial No. 238,273. Renewed January 28, 1909. Serial No. 474,807.

*To all whom it may concern:*

Be it known that I, WILLIAM H. MUZZY, a citizen of the United States, residing at Dayton, in the county of Montgomery and State of Ohio, have invented certain new and useful Improvements in Validating Stamping Systems, of which I declare the following to be a full, clear, and exact description.

This invention relates to improvements in validating devices for sales slips or checks used in connection with commercial transactions, such as the charging of goods, the sending of goods on approval and the sending of goods for collection on delivery, and any other transaction not involving the immediate payment of cash. The present apparatus is particularly designed for use in department stores where the credit men or those having charge of the credit accounts are located at a central office and must be communicated with by the sales persons at the various stations before a credit sale can be made or the goods otherwise removed from the store without payment thereon.

The principal object of the invention is to provide devices which may be manually operated for stamping O. K. or otherwise validating, the different credit, C. O. D. or approval slips made out by the salesman, and which devices are controlled in their operation by the credit man or men at a central station or office.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Figure 1:
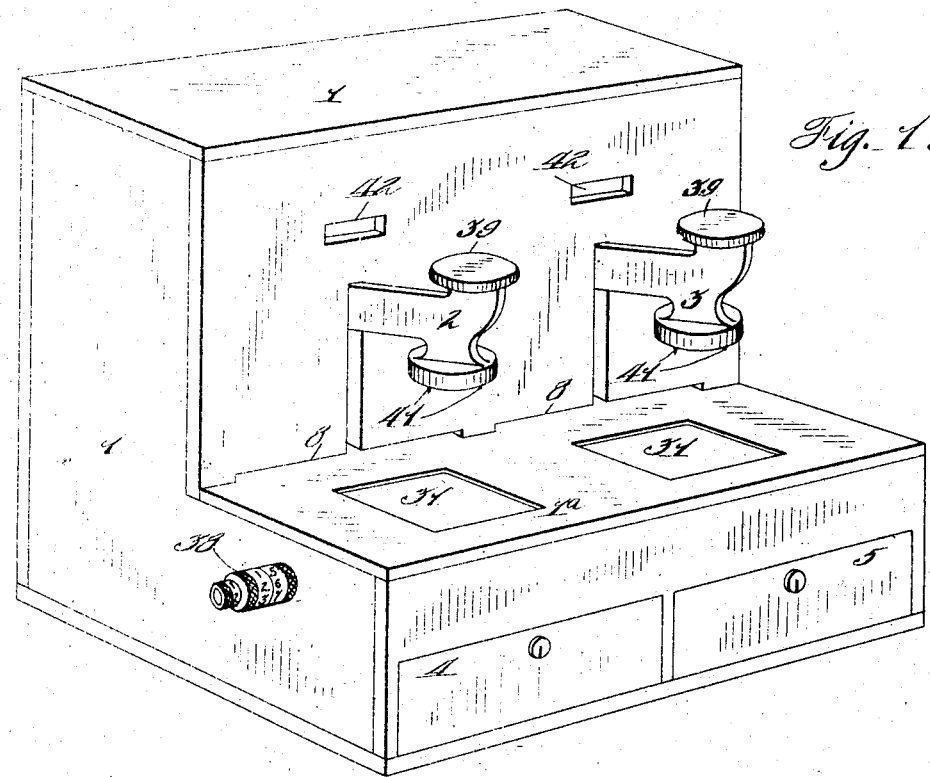
Figure 2:
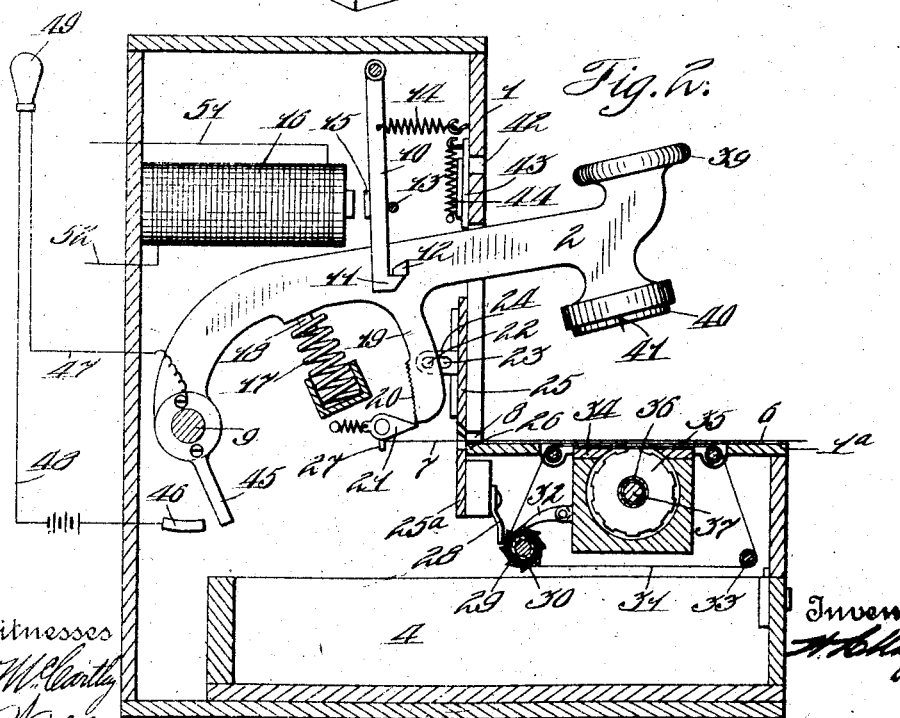

Of said drawings: Figure 1 represents a perspective view of a stamping apparatus embodying the invention. Fig. 2 represents a vertical section through the same on the line of one of the stamping levers. Fig. 3 represents a perspective view of the central controlling machine, and Fig. 4 represents a diagrammatical view of the electrical connections between the central machine and the branch machines.

In the said drawings 1 represents the casing or cabinet of one of the stamping devices or validating mechanism; 2—3 the stamping levers for the same, the latter constituting manually operated devices for the validating mechanisms, and 4—5, the drawers or receptacles for the reception of the vouchers or stubs. The cabinet 1 is of any desired construction, but is preferably of the form shown in Fig. 1 with the horizontal portion 1ª upon which the check or slip 6 to be O. K'd. may be laid, so that its voucher portion 7 will project through one of two slots 8 formed in the vertical portion of the cabinet for a purpose to be hereinafter more fully described. As the two levers and the corresponding parts are substantially identical one only will be described as this description will suffice for both. The levers 2 and 3 are pivoted upon a transverse shaft 9 and each of the same is normally held in its elevated position by a spring-drawn latch hook 10 suitably mounted in the casing and formed at its lower end with a beveled hook 11, which engages a beveled lug 12 projecting laterally from the lever. The hook 10 is normally drawn forward against a stop pin 13, by a coil spring 14, which connects it with the cabinet. The hook is provided with a soft iron block 15 which acts as an armature for an electromagnet 16 mounted in the casing to the rear of the latch. A coil spring 17 is mounted in a suitable channel bar secured in the casing directly below the levers 2 and 3. The upper end of this spring surrounds a stud 18 projecting from its lever but only extends to within a short distance of the lower edges of said lever, so that when the latch 10 is operated the lever will drop until it strikes the upper end of its spring, which will arrest it in such a position that it will not become re-latched when the latch is again released or allowed to pass forward. When the lever is depressed however, and then released, its spring 17 will force it upward with sufficient momentum to cause it to again become latched. To prevent the lever from making a partial stroke in either direction, it is formed with a pendent segmental arm 19, provided with a series of ratchet teeth 20. These teeth are engaged by a spring drawn reversible pawl 21, which reverses when the opposite ends of the rack formed by the teeth are reached, in a manner well known in the art.

By the above described devices, when either one of the levers 2 and 3 is released it is permitted to make but a single movement down and back, as it immediately becomes relatched when the lever rises to its upper position after being depressed. The arm 19 is provided with a laterally projecting pin 22, which enters an elongated slot 23 formed in an operating arm 24, which projects from a vertically sliding knife 25 mounted on a suitable frame 25ª guided in the cabinet. The knife 25 coöperates with a stationary knife 26 for severing the voucher 7 from the body of the check; the voucher having been arrested in the proper position by a stop lug 27 mounted on the pawl 21. The lower end of frame 25ª is provided with a feeding pawl 28, which, as the frame is reciprocated engages and feeds a ratchet-wheel 29 mounted upon one end of an inking roller 30, which is suitably journaled in the cabinet and acts as a supply and feeding roller for an endless ink ribbon 31. A retaining pawl 32 mounted on a portion of the cabinet or frame holds the ratchet 29 against retrograde movement. The ribbon 31 passes over suitable guide rollers 33 and over the stationary type plates 34, and the movable dating type wheels 35. These dating wheels are mounted upon the inner ends of a series of nested sleeves 36 and a shaft 37, which are suitably journaled in the cabinet and are provided with setting knobs 38 which project laterally from the casing for convenience of operation in changing the date. Each of the levers 2 and 3 is provided with an operating knob or button 39, a flexible platen 40 and needle finger 41. When a lever is depressed the platen 40 forces the body of the slip or check downward against the ink ribbon and this in turn against the type plates 34 and dating wheels 35. The check or slip is thus O. K'd. by printing suitable information from the stationary plates 34, such, for example, as validating characters, or the initial of the credit man identified with the particular stamp operated, or similar indicia. If desired, these plates may be removable at will for changing the information to be printed. When a lever is depressed the guard needles 41 pass through the check and the same cannot be drawn out from under the platen and a new check inserted until after the lever has passed through sufficient of its return movement to cause the pawl 21 to take hold of the teeth 20 and prevent another depression of the lever without its first having passed to its upper position. It is obvious that the perforation of the paper, or check, by reason of the needles 41 passing through the same, will serve as an added indication that the check has been O. K'd. As it is necessary to inform the clerk or sales person when any one of the levers has been released for operation, the cabinet or casing 1 is provided with suitable openings 42 located above the levers 2 and 3. When the lever is in its upper position it holds a sliding flash or shutter 43 elevated also, so that the indication on such shutter will be above its opening 42. The shutters 43 are slidably mounted in the cabinet and are connected thereto by coil springs 44 which act to draw them downward when released. When one of the latches 10 is actuated and its lever allowed to descend slightly, the slide 43 also descends and brings the proper information into view through the opening 42, by which means the clerk is notified that this particular lever has been released from the credit office and can be operated to O. K. the credit slip.

It is also necessary for the credit man at the central desk to know when one of the particular levers has been operated after being released and for this purpose each of the levers 2 and 3 is provided with a contact arm 45 which, when the lever is depressed contacts with a plate 46 which completes a circuit through wires 47 and 48 to a lamp or other indicating device 49, located at the credit man's station. This central station comprises a cabinet 50 somewhat similar to the cabinet 1 and is provided with the signal 49, which is lighted upon the operation of any one of the stamping levers. It will, of course, be understood that any number of these credit levers may be employed, but that for the sake of simplicity of illustration I have shown only two. The cabinet 50 also contains a number of switches 50ª corresponding to the number of latches 10 to be actuated. These switches are preferably of the "snap" variety and when operated are arranged to send a short impulse through wires 51 and 52 to their respective magnets 16, to momentarily energize the same and cause them to actuate the corresponding latches 10. By this form of switch the batteries employed in operating the magnet 16 are protected against any extended contacts, and only a single momentary contact can be made, thus prolonging the life of the battery. The lamp 49 can, of course, be supplanted by drop shutters, bells or any other signaling devices, it only being necessary to provide some means for informing the operator at the credit office of the fact that the stamp has been operated after being released. A number of jacks 55 for the different branch lines are mounted in the casing 50 and are arranged to be connected with the operator's switches by a connecting cord 56 and plug 57.

It will of course be understood that for each of the branch lines or sub-stations, such as shown numbered from 1 to 5 in Fig. 3, there are two jacks (numbered 50 and 100), each jack having its corresponding stamp. Thus, as above stated, there are two switches 50ª, one for each of the validating stamps, and of course a separate cord 56 and plug 57 with separate circuits connecting each switch 50ª with its corresponding jack and connected to the validating stamp. This enables the operator at the credit central station to release one or the other of the validating stamp levers 2 or 3, by selecting the corresponding switch lever 50ª and the corresponding jack 50 or 100.

If desired, the different stamping levers may be assigned to different credit men, in which case all the credits stamped would be without limit, but I prefer to have the different levers represent different credit limits, in which case the information printed by the stationary plates 34 would include such wording as, "Not over. $50.00," or "Not over $100.00." By this means the credit man, after being informed of the amount of credit desired could release the proper lever and thus prevent any liability of a slip being O. K'd. for a larger amount than he would authorize. The different levers could also be employed if desired for O. K'ing different transactions; for instance, one lever might be employed for O. K'ing simply a credit transaction, another for O. K'ing a C. O. D. transaction, and still another for O. K'ing a sent-on-approval transaction, all of which transactions are different forms of transactions involving the suspension of payment, although the goods are removed from the premises.

The cash drawers 4 and 5 are preferably provided with locks, so that should the different levers 2 and 3 be assigned to different credit men each man can carry the key to his particular voucher drawer, so that the vouchers belonging to the different credit men will collect in different drawers or receptacles and be thus kept separate for subsequent entry by the person to whom they belong.

It will, of course, be understood that each of the switches 50ª may be provided with a lock 50ᵇ so that when the switches are used for different credit men, one man may lock his particular switch when he leaves the office, so that no other credit man can O. K. over his line without his authority.

The electrical devices used in connection with the present invention are of such a character as to require only a very cheap grade of primary battery either in the form of a dry battery or the ordinary liquid cell, such as is employed in circuits for doorbells and the like.

The present invention is designed for use in connection with some auxiliary means, such as pneumatic tubes or telephones by means of which, the credit man at the central office is informed of the amount of credit and by whom the same is desired. The telephone system is the preferred form as by its use the credit man may be instantly informed of the name of the purchaser and the amount of credit desired and can at once release the particular credit stamp desired. When the device is used in connection with the pneumatic tube system the credit man is informed of the amount of the transaction and the person's name desiring the credit by means of a duplicate slip sent to the credit office through the tube. This last arrangement is however, not as rapid as the telephone system as considerably more time is required in sending the duplicate slip to the credit office than in telephoning the name and amount.

As to the operation of these previously described devices, it is pointed out that each operative lever 2 or 3 at the sub-station, together with its corresponding printing plate 34 and date wheels 35 constitutes a validating couple. The relative movement between the two members of this printing or validating couple permits the operation of validating, either by printing, or by perforating, or by both methods. The levers 2 and 3 constitute manually-operated devices for controlling the validating operation, the clerk or salesperson operating one or the other of these levers to complete the validating transaction and restore the parts preparatory to the next operation. As to which of these manual devices shall be released, or as to which of the validating couples or mechanisms shall be made operative, this depends upon the credit man at the central station, which is provided with the selective switches 50ª to control and render operative one or the other of the validating mechanisms. As soon as this selection has been accomplished from the central station, the signal (in the shape of the shutter 43) at the sub-station designates at the sub-station which validating mechanism has been put into operative condition, and upon the ensuing completion of the validating operation by the clerk's manipulation of the manual device (the lever 2 or 3), the central station is then apprised of this fact by means of the signal 49 at the central station. It will be obvious from the description already given, and from the construction shown in Fig. 2, that the lever 2 or 3 when unlatched drops slightly until it strikes the spring 17, and at that time the full-stroke pawl 21 has become effective to prevent the lever from being restored upward to normal position; therefore the operator would be compelled to operate the lever a full stroke down and up before the latching device can again become effective to control the validating mechanism. Furthermore, the lever must be carried to its uppermost and normal position in order to permit the full-stroke pawl to reverse again, and in such event the latch 10 again becomes effective so as to prevent the operator from operating the lever a second time, and thus after the central station has released the lever and given the same its initial movement, indicated by the special signal 43, the clerk at the sub-station must operate the validating mechanism to complete the validating operation and restore the movable member of the validating couple to normal position, where it is beyond the clerk's control and under the control of the central station, which latter condition is indicated at the central station by the signal 49. As also set forth hitherto, perforating devices 41 carried by the movable member of the validating couple project through the inserted ticket or slip when the movable member carrying the perforating needles is operated into contact with the other member of the couple; so that while in this position the perforating needles prevent the withdrawal of the ticket, and as soon as a sales clerk so operates this movable member of the validating couple as to withdraw the needles from the paper, the full-stroke device has become effective to prevent a second approach of the perforating device until its member has been restored completely to normal position, in which event the member is relatched in normal upper position, and is now under the sole control of the central station. It remains of course latched in this normal upper position until the credit man at the central station again operates the selective circuit to unlatch the said movable member of the validating couple, and the movable member then is given its initial movement beyond the control of the latching device, so that the credit man does not have to maintain the unlatching circuit closed, since the momentary depression of his switch-key causes this unlatching and initial movement of the said movable member, and permits the salesperson to operate the same when ready. The sales strip is validated by being placed between the two members of the validating couple, the voucher portion of the slip extending through the slot 8, so that upon the downward movement of the operating lever the voucher portion will be severed, while the body of the slip is stamped with the validating characters, the initial of the credit man; the date, or any other information desired.

While the forms of mechanism here shown and described are admirably adapted to fulfil the objects above stated, it is to be understood that the invention is not confined to the one form of embodiment herein disclosed, but is susceptible of embodiment in various other forms, all of which fall within the scope of the appended claims.

What is claimed is as follows:—

1. In a device of the class described, having a central station and a sub-station, the combination with a plurality of manually operated validating mechanisms at the sub-station, of selective means situated at the central station and having connections for selectively controlling the operation of the validating mechanisms at the sub-station.

2. In a device of the class described, having a central station and a sub-station, the combination with a plurality of hand-operated validating mechanisms at the sub-station, of means for latching said mechanisms in normal position; and a plurality of switch levers at the central station with electrical connections to the sub-station for unlatching any desired one of the said validating mechanisms.

3. In a device of the class described, having a central station and a sub-station, the combination with a validating couple at the sub-station, the members of said couple having movement relatively to each other; of means comprising apparatus at the central station for effecting an initial movement of one member of said couple to a position beyond the control of said controlling means.

4. In a device of the class described, having a central station and a sub-station, the combination with a validating couple at the sub-station, one member of said couple having movement relatively to the other member; of means for latching the said movable member in normal position; and controlling means comprising apparatus at the central station for effecting an operation of the latching means to permit an initial movement of the movable member to a position beyond the control of said latching means.

5. In a device of the class described, having a central station and a sub-station, the combination with a validating couple at the sub-station, one member of said couple having movement relatively to the other; of perforating devices carried on the movable member of the couple; of means comprising apparatus at the central station for effecting an initial movement of the perforating member to a position beyond the control of said controlling means as part of the complete validating operation.

6. In a device of the class described, having a central station and a sub-station, the combination with a validating mechanism at the sub-station, said validating mechanism including a manually-operated device; means comprising apparatus at the central station for controlling said validating mechanism; and means for preventing a second operation of the validating mechanism after one complete operation thereof until said mechanism has been completely restored to normal position again under the control of said controlling means at the central station.

7. In a device of the class described, having a central station and a sub-station, the combination with a validating mechanism situated at the sub-station, said validating mechanism including a manually-operated device; means comprising apparatus at the central station for controlling the operation of said validating mechanism; and means for compelling a sequence of operation between the said manual controlling device at the sub-station and the said controlling means at the central station.

8. In a device of the class described, having a central station and a sub-station, the combination with a validating mechanism situated at the sub-station, said validating mechanism including a manually-operated device and means normally preventing operation of said manually operated device, of controlling means comprising apparatus at the central station for disabling said preventing means; and means for compelling alternate operations first of the central station controlling means and then the sub-station manually-operated means.

9. In a device of the class described, the combination with a validating couple, one member of said couple having movement relatively to the other member; of perforating devices carried on said movable member of the couple; means for preventing a second approach of said perforating member after withdrawal of the same until said movable member has been restored fully to normal position.

10. In a device of the class described, the combination with a validating couple, one member of said couple having movement relatively to the other member, of means for latching said movable member in normal position; perforating devices carried by said movable member; means for unlatching said movable member to permit operation thereof; and means for preventing a second approach of said perforating member after withdrawal of the same from the other member of the couple, until said movable member has been restored to normal latching position.

11. In a device of the class decribed, the combination with a manually operated validating stamp, of a locking device for the same, and controlling mechanism for the lock independent of the same; connecting means intermediate the lock and controlling mechanism, with provision for locating said mechanism at any desired distance from the stamp; and means for preventing more than a single impression of the stamp when released.

12. In a device of the class described, the combination with a manually operated validating stamp; of locking devices for the same; electrical mechanism for operating the locking devices from a distance, and means requiring the relatching of the stamp after it has made a single operation before it again can be operated.

13. In a device of the class described, the combination with printing types, of a stamping lever carrying a platen; an electrically controlled lock for said lever; means for operating said lock from a distance; and devices for preventing more than a single impression by said lever after being unlocked.

14. In a device of the class described, the combination with a manually operated validating stamp, of locking devices for the same; means for operating said locking devices from a distance, and a full stroke mechanism requiring a full movement of the stamp and thus assuring its relocking before it again can be operated.

15. In a device of the class described, the combination with printing type, of a lever carrying a platen, a lock for said lever; means for operating the lock, a full stroke device for the lever; and guard points located adjacent to the platen for preventing the insertion of a slip until the lever has moved a predetermined distance upward.

16. In a device of the class described, the combination with a validating stamp including a manually operated lever therefor, of means for latching said lever in normal position; spring means for restoring the lever toward normal position, said spring being situated to permit lost motion connection between the lever and the spring when the lever is released; and a full stroke device coöperating with said lever to require a complete reciprocation of the lever back to normal latched position before it again can be operated.

17. In a device of the class described, having a central station and a substation, the combination with a validating couple at the sub-station, one member of said couple having movement relatively to the other member; of a controlling means comprising apparatus at the central station for effecting an initial movement of the said movable member of the couple to a position beyond the control of said controlling means; and a signal situated at the sub-station for indicating the initial movement of said movable member.

18. In a device of the class described, having a central station and a sub-station, the combination with a normally inoperative validating couple at the sub-station, one member of said couple having movement relatively to the other member; means comprising apparatus at the central station for controlling the said relative movement; and means for indicating that said relative movement has been effected.

19. In a device of the class described, having a central station and a sub-station, the combination with a validating couple at the sub-station, one member of said couple having movement relatively to the other member; of means for latching the said movable member in normal position; controlling means comprising apparatus at the central station for effecting an operation of said latching means to permit an initial movement of the movable member to a position beyond the control of the latching means; and a signal controlled by said movable member for indicating at the sub-station the unlatched condition of said movable member.

20. In a device of the class described, having a central station and a sub-station, the combination with a validating mechanism situated at the sub-station, said validating mechanism including a manually operated lever; of means for latching said lever in normal position; controlling means comprising apparatus at the central station for operating the said latching means to release said lever; and a signal device connected with said lever for indicating the unlatched condition of the same.

21. In a device of the class described, having a central station and a sub-station, the combination with a validating couple at the sub-station, one member of said couple having movement relatively to the other member; of controlling means comprising apparatus at the central station for effecting an initial movement of said movable member to a position beyond the control of said controlling means, and a signal situated at the central station and controlled by said movable member of the validating couple to indicate the further operation of the validating couple at the sub-station.

22. In a device of the class described, having a central station and a sub-station, the combination with a validating mechanism at the sub-station, said mechanism including a manually operated lever therefor; of means for latching said lever in normal position; means comprising apparatus at the central station for controlling the unlatching of said lever and effecting an initial movement thereof; an electric signal device located at the central station; and a circuit closing device having connection with said electric signal and operated by said lever for indicating at the central station the further operation of the said lever after initial movement thereof.

23. In a device of the class described, having a central station and a sub-station, the combination with a validating couple at the sub-station, one member of said couple having movement relatively to the other member, said member being normally inoperative, means comprising apparatus at the central station for controlling said member to render it operative; means for indicating that said member is in operative condition; and means for indicating at the central station that said movable member has received its relative movement.

24. In a device of the class described, having a central station and a sub-station, the combination with a validating mechanism at the sub-station, said mechanism including a manually operated lever therefor; of means for latching said lever in normal position; means comprising apparatus at the central station for effecting an unlatching of said lever and an initial movement therefor; an indicator connected with said lever for indicating at the sub-station the initially moved condition thereof; an indicator situated at the central station; and a circuit closer having electrical connection with said central station indicator and operated by said lever to cause the indication at the central station to show the completed operation of the lever.

25. In a device of the class described, the combination with a manually operated validating stamp, of a locking means for the same, devices for actuating the locking means from a distance; and a signal for indicating the released or locked condition of the stamp.

26. In a device of the class described, the combination with a manually operated validating stamp, of a locking device for the same; a controlling mechanism for the lock independent of the stamp; connecting means intermediate the lock and controlling mechanism, with provision for locating said mechanism at any desired distance from the stamp; a signaling device located in proximity to the controlling mechanism; and connecting means intermediate the signaling device and stamp.

27. In a device of the class described, the combination with a manually operated validating stamp, of locking devices for the same; means for operating said devices from a distance; a signal for indicating the released or locked condition of the stamp; and a second signal made active by the operation of the stamp.

28. In a device of the class described, the combination with printing types, of a lever carrying a platen, a lock for said lever; means for operating said lock from a distance; a flash for indicating when the lever is unlocked; and a signal operated by the lever for indicating its operation.

29. In a device of the class described, the combination with printing types, of a stamping lever, a lock for said lever, means for operating the lock from a distance, a full-stroke device on the lever; a spring for returning the lever to normal locked position; a knife actuated by the lever; and signals controlled by the movements of the lever to indicate its operative condition.

30. In a device of the class described, having a central station and a sub-station, the combination with a plurality of validating mechanisms at the sub-station; of selective means comprising apparatus at the central station for selectively controlling the operation of the validating mechanisms at the sub-station; and means operated by each validating mechanism for signaling at the central station the operation of any of the validating mechanisms at the sub-station.

31. In a device of the class described, having a central station and a sub-station, the combination with a plurality of manually operated validating mechanisms at the sub-station, of means for latching said mechanisms in normal position, selective means comprising apparatus at the central station for selectively unlatching said mechanisms at the sub-station to be operated, and means for signaling at the central station the operation of any of the validating mechanisms at the sub-station.

32. In a device of the class described, having a central station and a sub-station, the combination with a plurality of manually operated validating mechanisms at the sub-station, of means normally rendering said mechanisms inoperative, and selective means comprising apparatus at the central station for selectively rendering said mechanisms at the sub-station operative.

33. In a device of the class described, having a central station and a sub-station, the combination with a plurality of manually operated validating mechanisms at the sub-station, of means normally rendering said mechanisms inoperative, selective means comprising apparatus at the central station for selectively rendering said mechanisms at the sub-station operative, and means for signaling at the sub-station when any one of said mechanisms at the sub-station is rendered operative.

34. In a device of the class described, having a central station and a sub-station, the combination with a plurality of manually operated validating printing devices at the sub-station, of selective means comprising apparatus at the central station for selectively controlling the operation of the printing devices at the sub-station.

35. In a device of the class described, having a central station and a sub-station, the combination with a validating couple at the sub-station said couple comprising a printing element and a platen having a movement relative to each other, means for normally preventing said relative movement, means for disabling the preventing means, and controlling means situated at the central station for controlling said disabling means.

36. In a device of the class described, having a central station and a sub-station, the combination with a validating couple at the sub-station one member of which is adapted to be given a movement relative to the other, a latching means normally preventing movement of said movable member, said member being adapted to have an initial movement, upon the disabling of said latching means, to a position beyond the control of said means, and means comprising apparatus at the central station for controlling the disabling of the latching means.

37. In a device of the class described, having a central station and a sub-station, the combination with a validating couple at the sub-station one member of which is adapted to be given a movement relative to the other, latching means normally preventing said relative movement, controlling means at the central station and means controlled thereby for disabling said latching device, said movable member being adapted to have an initial movement to a position beyond the control of the latching means when the latter is disabled.

In testimony whereof I affix my signature, in the presence of two witnesses.

WILLIAM H. MUZZY.

Witnesses:
C. L. WILLISS,
W. M. McCARTHY.

Copies of this patent may be obtained for five cents each, by addressing the "Commissioner of Patents. Washington, D. C."